United States Patent [19]
Woollenweber et al.

[11] Patent Number: 6,032,466
[45] Date of Patent: Mar. 7, 2000

[54] MOTOR-ASSISTED TURBOCHARGERS FOR INTERNAL COMBUSTION ENGINES

[75] Inventors: William E. Woollenweber, Carlsbad; Edward M. Halimi, Montecito, both of Calif.

[73] Assignee: Turbodyne Systems, Inc., Carpinteria, Calif.

[21] Appl. No.: 08/856,131

[22] Filed: May 14, 1997

Related U.S. Application Data

[63] Continuation-in-part of application No. 08/680,671, Jul. 16, 1996, Pat. No. 5,870,894, and application No. 08/782,422, Jan. 14, 1997, abandoned.

[51] Int. Cl.[7] .................................................. F02B 37/10
[52] U.S. Cl. ............................................. 60/607; 417/407
[58] Field of Search ....................... 60/607, 608; 417/407

[56] References Cited

U.S. PATENT DOCUMENTS

| | | | |
|---|---|---|---|
| 2,078,499 | 4/1937 | Ljungstrom | 123/170 |
| 2,173,489 | 9/1939 | Voigt | 308/77 |
| 2,578,785 | 12/1951 | Davis | 230/209 |
| 2,649,048 | 8/1953 | Pezzillo et al. | 103/87 |
| 2,782,721 | 2/1957 | White | 103/87 |
| 2,829,286 | 4/1958 | Britz | 310/53 |
| 3,163,790 | 12/1964 | White | 310/54 |
| 3,557,549 | 1/1971 | Webster | 60/13 |
| 3,572,982 | 3/1971 | Kozdon | 417/423 |
| 4,253,031 | 2/1981 | Frister | 60/607 |
| 4,445,337 | 5/1984 | McCreary | 60/608 |
| 4,453,381 | 6/1984 | Dinger | 60/612 |
| 4,565,505 | 1/1986 | Woollenweber | 417/407 |
| 4,641,977 | 2/1987 | Woollenweber | 384/99 |
| 4,708,095 | 11/1987 | Luterek | 123/41.42 |
| 4,708,602 | 11/1987 | McEachern, Jr. et al. | 417/407 |
| 4,776,168 | 10/1988 | Woollenweber | 60/602 |
| 4,827,170 | 5/1989 | Kawamura et al. | 310/156 |
| 4,850,193 | 7/1989 | Kawamura | 60/608 |
| 4,878,347 | 11/1989 | Kawamura | 60/608 |
| 4,882,905 | 11/1989 | Kawamura | 60/608 |
| 4,885,911 | 12/1989 | Woollenweber et al. | 60/597 |

(List continued on next page.)

FOREIGN PATENT DOCUMENTS

| | | | |
|---|---|---|---|
| 295985 | 12/1988 | European Pat. Off. | F02B 37/14 |
| 367406 | 5/1990 | European Pat. Off. | F02B 39/10 |
| 2479899 | 10/1981 | France | F02C 6/12 |
| 57-212331 | of 0000 | Japan . | |
| 58-222919 | 12/1983 | Japan . | |
| 59-49323 | 3/1984 | Japan . | |
| 3-202633 | 4/1991 | Japan . | |
| 4-112921 | 4/1992 | Japan . | |
| 5-5419 | 1/1993 | Japan . | |
| 267149 | 8/1927 | United Kingdom . | |
| 308585 | 3/1929 | United Kingdom . | |

OTHER PUBLICATIONS

SAE Technical Paper 940842 "Turbo–Compound Cooling Systems for Heavy–Duty Diesel Engines", 1994, W.E. Woollenweber.

Proc. Instn. Mech Engrs. vol. 189, 43/75, "Experimental and Theoretical Performance of a Radial Flow Turbocharger Compressor with Inlet Prewhirl", 1975, pp. 177–186, F.J. Wallace, et al.

*Primary Examiner*—Michael Koczo
*Attorney, Agent, or Firm*—Brinks Hofer Gilson & Lione

[57] ABSTRACT

A particularly efficient and reliable motor-assisted turbocharger for internal combustion engines includes an assisting electric motor, a combination flow turbine wheel which may be inserted and removed from the turbocharger assembly through the exhaust opening of the turbine casing, and a divided volute turbine casing designed in a unique way so that the tips of the turbine blades can be extended to be closely adjacent to the turbine casing divider wall without complicating the mechanical design of the turbine, thereby providing an economical assembly with high-turbine efficiency compared with conventional, radial turbines used in turbochargers, and by providing in preferred embodiments, improved bearing support for the shaft, including reliable, stable shock- and vibration-resistant, high efficient, simple and economical bearing systems that are insertable and, permit inexpensive manufacture, maintenance, and repair of the turbochargers in which they are used.

36 Claims, 3 Drawing Sheets

U.S. PATENT DOCUMENTS

| | | | |
|---|---|---|---|
| 4,894,991 | 1/1990 | Kawamura | 60/608 |
| 4,901,530 | 2/1990 | Kawamura | 60/608 |
| 4,918,923 | 4/1990 | Woollenweber et al. | 60/614 |
| 4,935,656 | 6/1990 | Kawamura | 310/156 |
| 4,955,199 | 9/1990 | Kawamura | 60/608 |
| 4,958,497 | 9/1990 | Kawamura | 60/608 |
| 4,958,708 | 9/1990 | Kawamura | 192/98 |
| 4,981,017 | 1/1991 | Hara et al. | 60/608 |
| 4,998,951 | 3/1991 | Kawamura | 60/608 |
| 5,025,629 | 6/1991 | Woollenweber | 60/600 |
| 5,038,566 | 8/1991 | Hara | 60/608 |
| 5,074,115 | 12/1991 | Kawamura | 60/608 |
| 5,088,286 | 2/1992 | Muraji | 60/608 |
| 5,094,587 | 3/1992 | Woollenweber | 417/107 |
| 5,121,605 | 6/1992 | Oda et al. | 60/608 |
| 5,176,509 | 1/1993 | Schmider et al. | 417/423.7 |
| 5,406,979 | 4/1995 | Kawamura | 60/608 |
| 5,560,208 | 10/1996 | Halimi et al. | 60/608 |
| 5,605,045 | 2/1997 | Halimi et al. | 60/607 |

6,032,466

MOTOR-ASSISTED TURBOCHARGERS FOR INTERNAL COMBUSTION ENGINES

This is a continuation in part of U.S. patent application Ser. No. 08/680,671, filed Jul. 16, 1996 (now U.S. Pat. No. 5,870,894), and U.S. patent application Ser. No. 08/782,422, filed Jan. 14, 1997 (now abandoned).

FIELD OF THE INVENTION

This invention relates generally to supercharging apparatus for use with internal combustion engines, and more particularly to a motor-assisted turbocharger with components providing high efficiency and exceptional engine performance enhancement capability.

BACKGROUND OF THE INVENTION

Turbochargers are well known and widely used with internal combustion engines. Turbochargers convert energy of the engine exhaust gas to an increased supply of charge air to the cylinders of the engine. Generally, turbochargers supply more charge air for the combustion process than can otherwise be induced through natural aspiration. The increased charge air supply allows more fuel to be burned, thereby increasing power and torque obtainable from an engine having a given displacement and improved performance characteristics from available production engines. Additional benefits include the possibility of using lower-displacement, lighter engines with corresponding lower total vehicle weight to reduce fuel consumption. Some turbocharger applications include the incorporation of an intercooler for removing heat (both an ambient heat component and heat generated during charge air compression) from the charge air before it enters the engine, thereby providing an even more dense air charge to be delivered to the engine cylinders. Intercooled turbocharging applied to diesel engines has been known to at least double the power output of a given engine size, in comparison with naturally aspirated diesel engines of the same engine displacement.

Additional advantages of turbocharging include improvements in thermal efficiency through the use of some energy of the exhaust gas stream that would otherwise be lost to the environment, and the maintenance of sea level power ratings up to high altitudes.

At medium to high engine speeds, there is an abundance of energy in the engine exhaust gas stream and, over this operating speed range, the turbocharger is capable of supplying the engine cylinders with all the air needed for efficient combustion and increased power and torque output for a given engine construction. In certain applications, however, an exhaust gas waste gate is needed to bleed off excess energy in the engine exhaust gas stream before it enters the turbocharger turbine to prevent the engine from being overcharged with air. Typically, such waste gates are set to open and to limit exhaust gas energy at a pressure below which undesirable predetonation or an unacceptably high internal engine cylinder pressure may be generated.

At low engine speeds, such as idle speed, however, there is disproportionately little energy in the exhaust system than may be found at higher engine speeds, and this energy deficiency prevents the turbocharger from providing a significant level of charge air boost in the engine intake air system. As a result, when the throttle is opened for the purpose of accelerating the engine from low speeds, such as idle speed, there is a measurable time lag and corresponding engine performance delay, before the exhaust gas energy level rises sufficiently to accelerate the turbocharger rotor and provide the compression of intake air needed for improved engine performance. The performance effect of this time lag may be pronounced in smaller output engines which have a relatively small amount of power and torque available before the increased turbocharger output provides the desired compression.

Various efforts have been made to improve turbocharger performance, including reductions of inertia of turbocharger rotors. U.S. Pat. No. 4,641,977 discloses an efficient turbocharger bearing system including a ball bearing mounted in a rotatable sleeve with a full floating journal bearing located adjacent the turbocharger turbine, with the thrust load and compressor end radial load being supported by the ball bearing. U.S. Pat. Nos. 4,565,105 and 5,094,587 disclose embodiments of turbocharger turbines that use the flow of exhaust gas more efficiently, especially at lower engine speeds.

In spite of evolutionary design changes and minimizing the inertia of the turbocharger rotor, however, the time lag period is still present to a significant degree, especially in turbochargers for use with highly rated engines intended for powering a variety of on-highway and off-highway equipment.

Furthermore, to reduce exhaust smoke and emissions during acceleration periods, when an optimal fuel burn is more difficult to achieve and maintain as compared with steady-speed operation, commercial engines employ devices in the fuel system to limit the fuel delivered to the engine cylinders until a sufficiently high boost level can be provided by the turbocharger. These devices can reduce excessive smoking, but the limited fuel delivery rate is a further cause of sluggishness in engine performance.

The turbo-lag period can be mitigated and, in many instances, virtually eliminated by using an external power source to assist the turbocharger in responding to engine speed and load increases. One such method is to use an external electrical energy supply, such as energy stored in d.c. batteries, to power an electric motor attached to the turbocharger rotating assembly. The electric motor can be external and attached to the turbocharger rotor through a clutching mechanism, or it can be added onto the turbocharger rotating assembly and energized and de-energized through the use of appropriate electronic controls.

Patents disclosing turbocharger-electrical machine combinations include U.S. Pat. Nos. 5,560,208; 5,406,797; 5,038,566; 4,958,708; 4,958,497; 4,901,530; 4,894,991; 4,882,905; 4,878,317 and 4,850,193.

In some turbocharger-electrical machine combinations, permanent magnets, as electrical machine rotor elements, have been attached to the turbocharger shaft. The attachment of the permanent magnets to the turbocharger shaft has a major disadvantage in that the magnets are subjected to heat which is conducted along the shaft from the hot turbine wheel of the turbocharger, and the permeability of the magnets may be reduced by such heating to a level which may be unacceptable for efficient operation of the electric machine. When the turbocharged engine is subjected to a hot shutdown and the lubricating oil flow through the turbocharger bearings and over the turbocharger shaft is interrupted, a steep temperature gradient will exist for a significant length of time until the hot parts of the turbocharger are drained of their heat content.

In other turbocharger-electrical machine combinations, permanent magnet machine rotor elements have been mounted on the aluminum compressor wheel of a turbocharger outboard of the turbocharger shaft bearing system.

The addition of motor components such as rotor magnets to the turbocharger compressor wheel, however, can result in increasing the overhang of the compressor wheel to such an extent that the stability of the turbocharger bearing system becomes questionable. Most commercial turbochargers in general use on internal combustion engines employ a bearing system in which two floating bushings are used with an outboard stationary thrust bearing.

SUMMARY OF THE INVENTION

The invention provides a particularly efficient and reliable motor-assisted turbocharger for internal combustion engines by providing an assisting electric motor, a combination flow turbine wheel which may be inserted and removed from the turbocharger assembly through the exhaust opening of the turbine casing, and a divided volute turbine casing designed in a unique way to that the tips of the turbine blades can be extended to be closely adjacent to the turbine casing divider wall without complicating the mechanical design of the turbine, thereby providing an economical assembly with high-turbine efficiency compared with conventional, radial turbines used in turbochargers, and by providing in preferred embodiments, improved bearing support for the shaft, including reliable, stable, shock- and vibration-resistant, highly efficient, simple, and economical bearing systems that are insertable and, permit inexpensive manufacture, maintenance, and repair of the turbochargers in which they are used.

In motor-assisted turbochargers of the invention, an assisting electric motor is provided in the compressor end of the turbocharger housing adjacent the turbocharger compressor and a turbine casing forming two volute passageways is located at the turbine end of the housing surrounding the turbocharger turbine wheel. One volute portion of the turbine casing lies generally on the compressor side of a plane normal to the axis of rotation, passing through the rearmost point of the turbine inlet opening; and the other volute portion lies generally on the compressor side of a plane normal to the axis of rotation, passing through the forwardmost part of the turbine inlet opening. The meridional or central divider of the turbine casing which forms the two volute exhaust gas passageways lies generally on the compressor side of a plane normal to the axis of rotation, passing through that portion of the turbine wheel closest to the compressor; and both side surfaces of the central divider form outlet portions with acute included angles with respect to the axis of rotation of the turbine and direct exhaust gas generally toward the exhaust opening of the turbocharger.

The preferred bearing system for motor-assisted turbochargers of the invention include reliable anti-friction rolling bearings and comprise basically an elongated outer race adapted to be rotatable in the turbocharger housing and to provide an anti-friction rolling bearing and cooperate with a full-floating sleeve to carry the rotating shaft. The sleeve bearing is located by the bearing system within the turbocharger at the end of the machine exposed to high temperature, and the rolling bearing is located at the compressor end of the turbocharger. The bearing system may be adapted to be insertable into a turbocharger housing. The outer race of the system has preferably an elongated, cylindrical, outer bearing surface adapted to be carried rotatably on a film of lubricant at its interface with the turbocharger housing, and the outer race and the full-floating sleeve bearing can include passageways to provide a flow of lubrication to the interface between the sleeve bearing and the rotating shaft. The inner surface of the outer race can have an expanding diameter to provide a flow of lubricant from the sleeve bearing to the elements of the rolling bearing, and the end of the system adjacent the rolling bearing may be provided with outwardly projecting surfaces, generally transverse to the axis of rotation, to form thrust bearings.

Other features and advantages of the invention will be apparent from the drawings and more detailed description that follow.

DETAILED DESCRIPTION OF THE BEST MODE OF THE INVENTION

The invention combines, in a turbocharger assembly 10 for use with an internal combustion engine, the components of an assisting electric motor 11 and an efficient gas turbine 12, both supported by a bearing system 13, which is preferably an efficient roller bearing system.

Figure 1:
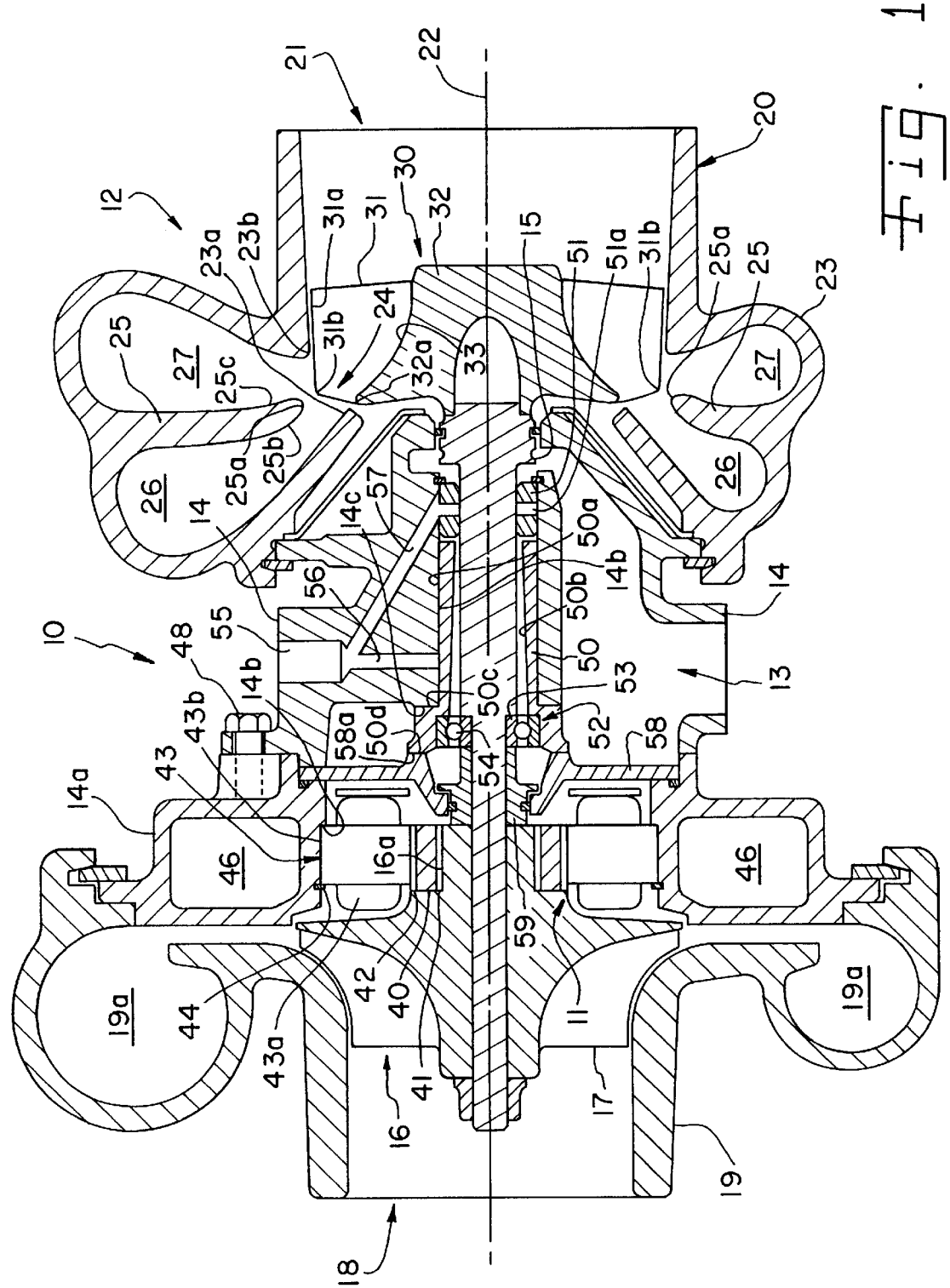
FIG. 1 is a cross-sectional view of a preferred embodiment of the invention, taken at a vertical plane through its axis of rotation.

As shown in FIG. 1, the motor-assisted turbocharger 10 includes the electric motor 11 within the turbocharger 10 adjacent its compressor end with the efficient turbine 12 adjacent the other end of the assembly. A housing or bearing support 14 supports a rotatable shaft 15 carrying a compressor wheel 16 having a plurality of vanes 17 adjacent and outboard of the electric motor 11, and at its opposite end an exhaust turbine wheel 30 with a plurality of blades 31 extending outwardly from a central core 32. The turbine 12 includes a turbine casing 20, described in greater detail below, that is connected to receive exhaust gas from an internal combustion engine. The turbine casing 20 includes a volute portion 23 having a central divider 25 forming two volute passageways 26 and 27, each passageway receiving exhaust gas from a different set of engine cylinders (not shown). The turbine casing 20, most particularly, the outlet portions of volute passageways 26 and 27 adjacent the turbine wheel 30, direct exhaust gas through and drive the turbine wheel 30 and shaft 15 in rotation. After passing through the turbine wheel 30, the exhaust gas flows out of the turbocharger through an exhaust opening 21. Rotation of shaft 15 secured in the bearing housing 14 rotates the attached compressor wheel 16 at the opposite end of the shaft 15, and combustion air is drawn in through an air intake opening 18 formed by a compressor casing 19. The compressor casing 19 forms a scroll 19a for receiving compressed gas from the compressor wheel 16 for direction to the intake manifold of an internal combustion engine (not shown).

Thus, upon operation of the turbocharger by the exhaust gas of the internal combustion engine and its action on turbine wheel 30, charge air for an internal combustion engine can be drawn into the air inlet 18 of the turbocharger, compressed by the rotating compressor wheel vanes 17, which are formed in the front face of the compressor wheel, and delivered through the scroll 19a as charge air for the cylinders of an internal combustion engine.

As shown in FIG. 1, the internal assisting electric motor 11 includes a plurality of magnets 40 mounted in a generally circumferential arrangement about the back face of the compressor wheel 16 at a constant radial offset from the rotatable and rotating shaft 15, although the arrangement of magnets may be repositioned or reoriented in machines of the invention for better balancing inertia, generated torque and the like. The magnets 40 may be comprised in the subassembly including an inner ring 41 and an outer steel retention sleeve 42 which may be slipped over and fastened to a magnet carriage portion 16a formed at the back of the compressor wheel 16 and retained in place by the circumferentially extending outer steel retention sleeve 42.

A motor stator 43 may be formed by a plurality of stator windings 43a wound around a laminated steel core 43b. The stator winding 43a may be located in and carried by a removable housing part 14a of the turbocharger housing 14 in a position surrounding the motor magnets 40 mounted to the rotatable shaft 15, with a small air gap between the interior circumference of the motor stator core 43b and the steel retention sleeve 42. The wires connecting the stator winding 43a with the electrical drive and control extend from the removable housing part 14a for connection with an electrical control and drive circuit (not shown). The stator winding 43a can be inserted into the removable housing part 14a and seated on a shoulder 14b formed therein and retained in the removable housing part 14a by a snap ring 44.

When the stator 43 is energized by the electric control and power source, a rotating magnetic field is formed in the gap between the stator 43 and the magnets 40, and the interaction between the rotating magnetic field and the magnetic field of the magnets 40 applies torque to the rotatable shaft 15 which can augment the torque being applied to the rotatable shaft 15 by the exhaust turbine 12. Thus, by energizing the stator windings 43a the compressor wheel 16 can be rotated faster than if it were rotated by only the turbine wheel 30, and faster rotation of the compressor wheel 16 can provide combustion charge air to the internal combustion engine with a greater flow and a higher pressure than when rotation is generated by the turbine wheel 30 alone.

The turbocharger assembly may carry one or more Hall effect sensors, preferably at its center location in the laminated steel core 43b to provide feedback on the position of the magnets 40 and the rotational speed for the electric motor control.

By virtue of the location of motor magnets 40 at the back of the compressor wheel 16 and outboard of the bearing system 13, the motor magnets remain relatively cool and isolated from the heat generated by the exhaust gas turbine 12. The air entering the compressor air intake opening 18 is generally at ambient temperature and the temperature rise due to compression by the vanes 17 of the compressor wheel 16 takes place generally outboard of the location of the magnets 40 on the back of the compressor wheel 16. Furthermore, the stator windings 43a may be cooled by providing a coolant flow path 46 in the removable housing part 14a in heat transfer relationship with the stator windings 43a. As shown, for example, in FIG. 1, the removable housing part 14a is formed with an annular coolant flow path 46 in close proximity with the stator windings 43a so that cooling water from the engine cooling system can be circulated through the coolant flow path 46 to maintain the stator windings 43a at a lower and acceptable operating temperature.

The means defining the efficient turbine 12 includes the turbine casing 20 and the turbine wheel 30 having a plurality of blades 31 extending outwardly from the central core or hub 32. As shown in FIG. 1, the turbine wheel 30 has a maximum diameter that permits the turbine blades 31 to pass through the exhaust opening 21 of the turbine casing and along its central axis 22, which is generally the intended axis of rotation of the rotating parts of turbocharger 10.

As shown in FIG. 1, turbine casing 20 forms the volute portion 23 that extends around the periphery of the turbine wheel 30 and forms an exhaust outlet-turbine inlet opening 24. In the embodiment shown in FIG. 1, the volute portion 23 of the turbine casing 20 includes a meridional or central divider 25 forming two volute passageways 26 and 27 that extend around the periphery and direct their respective gas outlets into the turbine through exhaust outlet turbine inlet opening 24. The turbine inlet opening 24 is defined by turbine casing portion 23a at the rear of the turbine and casing portion 23b defining the forwardmost edge of the turbine inlet opening. Where in the description we use the term "rearwardly" in describing the turbine means 12, we refer generally to parts of the turbine means 12 lying closest to the compressor means 16 and when we use the word "forwardly" in describing the turbine means 12, we mean those portions of the turbine means 12 lying more in the direction of the turbine exhaust opening 21. When we refer to "axially", we are referring to the axis of rotation 22 of the turbocharger.

In the centrally divided turbine casing shown in FIG. 1, volute passageway 26 and the central divider 25 lie substantially rearwardly of the plane in which the rearmost points 32a of turbine 30 rotate. Volute passage 27 lies in large part rearwardly of the forwardmost point 23b of the turbine inlet opening 24.

The outer surface 33 of the central core 32 of turbine 30 is formed in such a manner that lines lying generally along its axis of rotation 22 and tangent to surface 33 over substantially its entire axial extent lie at acute included angles generally less than about 50 degrees, with respect to its axis of rotation 22. As shown in FIG. 1, the included angle adjacent the turbine inlet 32a is about 45 degrees and decreases substantially in the direction of the turbine exhaust outlet 21.

In the embodiment shown, the tips of the turbine blades 31a extend rearwardly to form portions 31b that lie closely adjacent the innermost termination 25a of the central divider 25 of volute portion 23. The rearwardmost inside surface of the volute portion 23 of the casing 20 adjacent the turbine inlet 24, i.e., at 23a, will direct exhaust gas leaving the volute passageway 26 in a direction generally parallel to (i.e., tangent to) the outer surface 33 of central core 32 of the turbine wheel at its rearward end, i.e., adjacent 32a. The inside surface 25b of the outlet portion of volute passageway 26 lies at such an angle with respect to the outer surface 33 of the central core 32 of the turbine and to its axis of rotation 22 that it directs exhaust gas at acute angles with respect to both the outer surface 33 of the central core and with respect to its axis of rotation 22.

Although exhaust gas is directed from volute passageway 27 generally radially with respect to the turbine wheel, the surface 25c forms the outlet portion of volute passageway 27 at an acute angle with respect to the outer surface 33 of central core 32 of turbine 30 and generally toward the exhaust opening 21. Thus in the embodiment shown in FIG. 1, substantially all of the exhaust gas leaving the volute portion 26 and some of the exhaust gas leaving the volute portion 27, of turbine casing 20 is directed at an acute angle with regard to the axis of rotation of the turbine and generally toward the exhaust opening 21 of the turbine; and thus the volute portion 23 of turbine casing 20 may be considered to be canted rearwardly of the turbine.

The turbine 12 provides a combination flow turbine, that is, a turbine having axial as well as radial flow and a reduction in energy lost in deflection of the exhaust gases, and permits the ends of the turbine blades to be extended closely to a termination of any central dividing wall of the volute portion of the turbine casing to reduce communication of gases between the divided passageways; e.g., between vortical passageways 26 and 27. Thus, the turbine operates with greater efficiency by virtue of its axial flow and reduction of mixing and loss at the turbine inlet opening and the reduction of energy lost due to deflection of the exhaust gases.

In addition the turbine casing 20 including volute portion 23 can also be formed so it is canted more rearwardly, that is, more in the direction of the compressor end and the outlet portions both volute passageways 26 and 27 may direct the engine exhaust gas more axially and the outlet portion of volute passageway 27 may also be less than the diameter of the turbine blades adjacent its forwardmost point 23b, as shown in U.S. Pat. No. 5,094,587.

Figure 2:
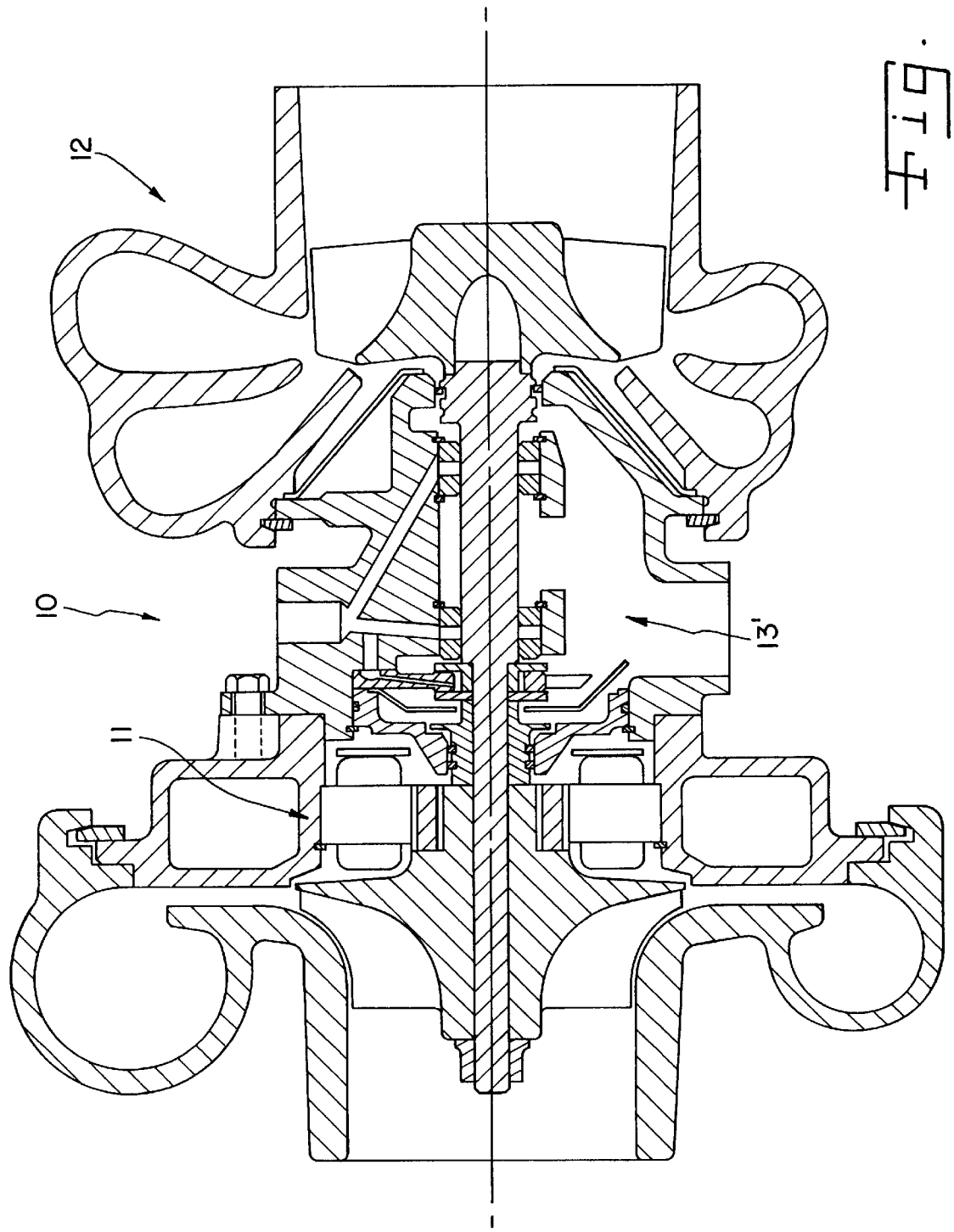
FIG. 2 is a cross-sectional view of an embodiment of the invention with a conventional bearing system, taken at a vertical plane through its axis at rotation.

As indicated above, the motor-assisted turbocharger 10, in addition to the assisting electric motor 11 and efficient turbine 12, includes a bearing system 13 to rotatably support the compressor wheel 16, turbine wheel 30 and their interconnecting and rotating shaft 15. Although a conventional bearing system may be used as shown in FIG. 2, a preferred motor-assisted turbocharger and bearing system of the invention is shown in FIG. 1. The turbocharger illustrated in FIG. 2 is like that of FIG. 1 except for the conventional bearing system 13' and the parts of the turbocharger that mate with the bearing system 13'.

The bearing system 13 of FIG. 1 comprises an outer race 50 adapted to be rotatable in its supporting bearing housing 14 and to cooperate with a full-floating sleeve bearing 51 at one end and a rolling bearing 52 at the other end. The bearing system 13 locates the sleeve bearing 51 adjacent the hot end of the turbocharger, and locates the rolling bearing 52 adjacent the compressor end. As shown in FIG. 1, the full-floating sleeve bearing 51 may be of a conventional type, commonly used in turbochargers.

The roller bearing 52 comprises an inner race 53 and a plurality of rolling elements 54 interposed between shaft 15 and outer race 50. The outer race 50 can be machined on its interior surface to cooperate with the inner race 53 and a plurality of rolling elements 54 to provide an anti-friction bearing at the end opposite the sleeve bearing 51, or the outer race 50 can carry a conventional rolling bearing as shown. The outer race 50 includes an outer bearing surface 50a adapted to be rotatably carried by the inner bearing surface 14b of housing 14. The inner surface 50b of the outer race expands from the end adjacent the sleeve bearing 51 to the end forming the roller bearing 52 to provide a flow of lubrication to the rolling elements 54 of the rolling bearing 52. The outer surface 50a of the outer race 50 may also provide a thrust bearing. Such a thrust bearing may be provided by a pair of outwardly projecting surfaces 50c and 50d projecting transversely of the axis of rotation from the outer surface of the outer race 50. Preferably surfaces 50c and 50d are a pair of spaced and parallel surfaces that lie normal to the axis of rotation of the rotating system, but it is not necessary that the thrust-bearing surfaces lie normal to the axis of rotation of the rotating system or be parallel. In addition, the surface 50d may be formed by only that portion of the outer race 50 lying next adjacent the rolling elements 54.

The entire bearing system 13 is free to rotate in the stationary housing 14. As shown in FIG. 1, lubricating fluid (such as oil) is introduced into passageways 55, 56 and 57 in the stationary housing 14. Such lubricating fluid flows through the passageways 56 and 57 to the interface between the housing 14 and the outer race 50 of the bearing system.

As shown in FIG. 1, the sleeve bearing 51 includes a passageway 51a communicating with passageway 57 to provide a flow of lubrication to the inner bearing surface of the sleeve bearing 51.

As shown in FIG. 1, bearing system 13 may be inserted into the motor-assisted turbocharger 10 with compressor end parts 19, 16, 17, 14a, 58 and 59 removed. The insertion of the bearing system 13 into the machine 10 is accomplished by merely sliding the sleeve bearing 51 and anti-friction bearing over the compressor end of shaft 15 with sleeve bearing 51 preceding rolling bearing 52. With the clearances set forth above, the bearing system 13 may be placed in position between the rotating shaft 15 and the stationary machine element 14 with relative ease. The inner race 53 of rolling bearing 52 is clamped after such installation by the machine spacer element 59 as the compressor wheel 16 is clamped to rotate with shaft 15, and the inner race 53 will thus rotate with shaft 15. It is possible to extend inner race 53 and to omit spacer element 59 in many systems.

In the motor-assisted turbocharger 10, the rotating shaft 15 becomes heated and, thus, must expand axially in response to thermal expansion of the material from which it is made. In bearing system 13, thrust-bearing surfaces are provided adjacent the rolling bearing 52 at the cooler end of the machine; the sleeve bearing 51 is located at the hotter end of the machine; and the shaft 15 is free to expand through the sleeve bearing in response to the heat to which it is exposed.

The bearing system 13 is also provided with thrust-bearings by surfaces 50c and 50d. As shown in FIG. 1, the housing 14 may be provided with a thrust bearing surface 14c mating the outwardly projecting bearing surface 50c at the outer surface of the outer race 50 of the bearing system. In addition, the housing 14 may be provided with a separate thrust bearing member 58 provided with a bearing surface 58a mating the outwardly projecting, thrust-bearing surface 50d of the outer race of the bearing system. Upon insertion of the bearing system 13 into the turbocharger 10 and as the removable housing part 14a is fastened to the bearing housing 14, for example, by a fastener 48, a thrust bearing is formed between surfaces 50c and 50d of the outer race 50 and corresponding stationary surfaces 14c and 58a of the thrust bearing member 58. The dimensions of the system are such that an end play or axial clearance between surfaces 50c and 50d of the outer race and surface 14c and 58a of the machine are on the order of about 0.0102 cm. to about 0.0204 cm.

Referring now to FIG. 1, lubricating fluid, which is provided to the interface between the outer bearing surface 50a of the outer race and the inner bearing surface 14b of the housing through passageways 56 and 57, will flow between the thrust-bearing surface 50c and the corresponding surface 14c to lubricate this thrust bearing.

The bearing system 13 also permits lubricating fluid to lubricate the sleeve bearing 51, the rolling bearing 52, and the other thrust-bearing interface. Lubricating fluid through passageway 57, in addition to lubricating the interface between the outer surface 50a of outer race and the inner bearing surface 14b of the housing, will flow to passage 51a of the sleeve bearing 51. The lubricating fluid will thus form a film of lubrication between the rotating shaft 15 and the sleeve 51. A portion of the lubrication for the sleeve bearing 51 will flow from the sleeve bearing in the direction of the rolling bearing 52. The lubricating fluid will be flung to and will flow over the inner surface 50b of the outer race 50 and provide a flow of lubrication to the rolling elements 54 of rolling bearing 52. Upon escape from the rolling bearing 52, the lubrication will flow into the interface between thrust-bearing surface 50d and the corresponding bearing face 58a and thereby lubricate the other thrust bearing. If the flow of lubrication to the thrust bearing from sleeve bearing 51 is insufficient, an axial passageway may be formed from passageway 56 of the housing 14 to and through that portion of the outer race 50 lying between 50c and 50d.

After the oil has left the bearing system, it will flow outwardly of the machine; for example, through the oil drain openings in the machine in a manner know.

Bearing system 13 is free to move radially in response to unbalanced conditions of the mass carried by the rotating shaft. Satisfactory stability is obtained if the outer race of the bearing system is allowed to rotate at about one-half the speed of the shaft, but it is preferable that the outer race rotate more slowly as the stability is enhanced at lesser fractions of the speed of the rotating shaft. It is possible to limit the rotational speed of the outer race 50 to a range of from about one-third to about one-tenth of the rotating shaft's speed due to the frictional drag imposed by the elongated cylindrical bearing surfaces such as 50a, and the thrust-bearing surfaces 14c and 58d of the preferred bearing system. Such rotation of the outer race 50 lowers the relative speed between the rolling elements 54 of the rolling bearing 52 and the outer race 50, substantially enhancing the bearing life of the rolling bearing 52 and substantially reducing the frictional losses associated with both the rolling bearing. It is believed the optimum ratio between the speed of the outer race and the speed of the rotational shaft is somewhat less than 0.1. The full-floating sleeve bearing 51 of the FIG. 1 embodiment will tend to rotate at a speed independent of the outer race 50 as a result of the thermal expansion of shaft 15 and the radial force imposed on sleeve bearing 51. In such embodiments, sleeve bearings 51 will rotate at speeds in the range of 0.4 to 0.5 times the speed of rotating shaft 15, thus substantially reducing the bearing losses and improving the life of the bearing system.

In its preferred embodiment, the outer surface 5Oa of the outer race 50 is preferably an elongated cylindrical bearing surface. Such a surface provides substantial frictional drag with respect to stationary housing 14 and thus substantially reduces the relative speeds of rotation between the outer race 50 and the rolling elements 54 and between the rolling elements 54 and their inner race 53. In addition, such a preferred embodiment can provide substantial spacing between the sleeve bearing 51 and the rolling bearing 52 and permits a simple, insertable beating system for the motor-assisted turbocharger 10.

Figure 3:
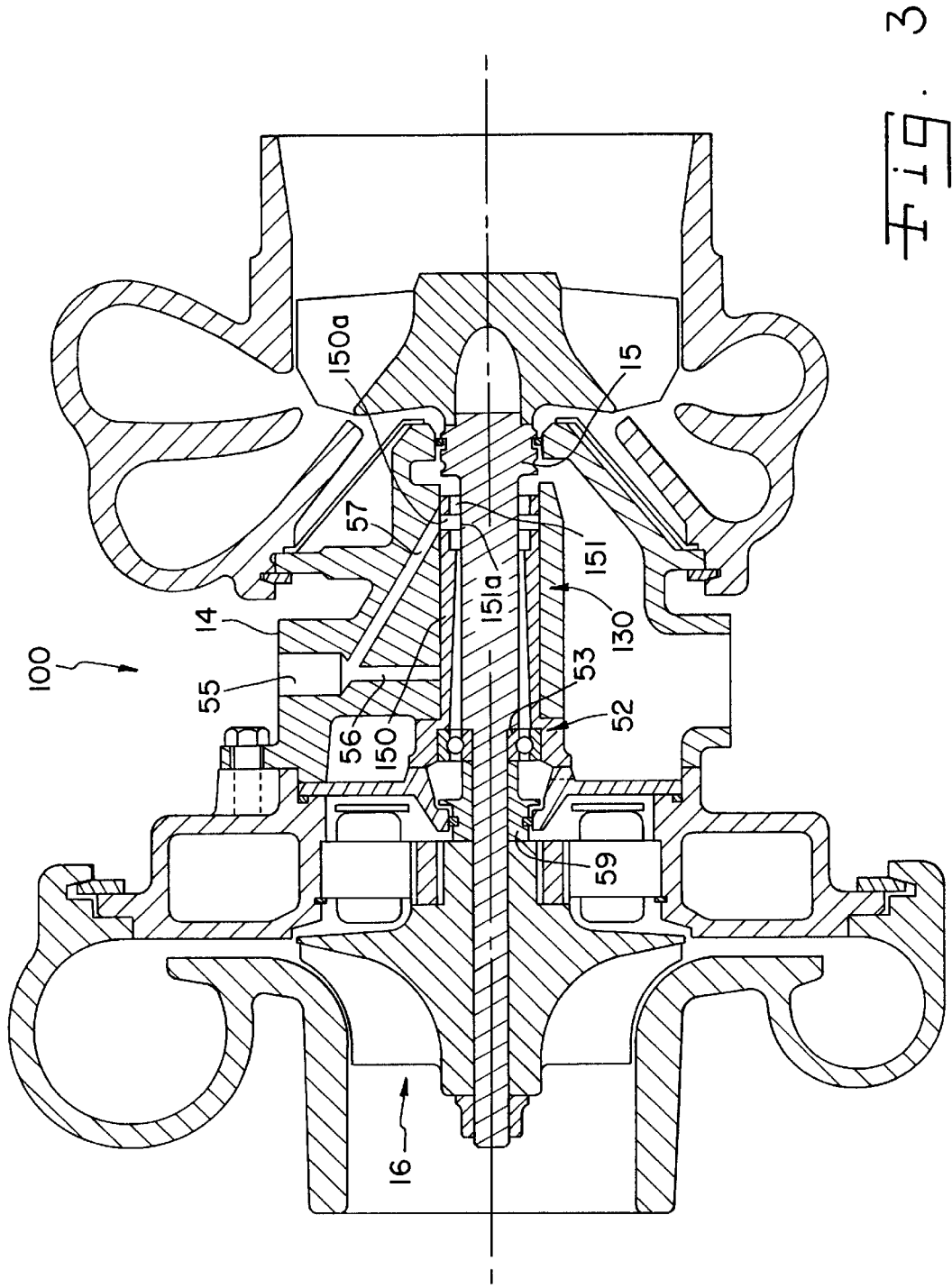
FIG. 3 is a cross-sectional view of another preferred embodiment of the invention, taken at a vertical plane through its axis of rotation.

The turbocharger 100 illustrated in FIG. 3 is identical to that of FIG. 1 except for the bearing system 130 and the manner in which it provides sleeve beating for the rotating shaft 15. Except for the reference numbers included in the description of bearing system 130 that follows, reference numbers for the other elements and parts of turbocharger 100 of FIG. 3 have been omitted from FIG. 3; however, the unnumbered elements and parts of FIG. 3 are identical to the corresponding elements and parts of FIG. 1.

The bearing system 130 of FIG. 3 comprises an outer race 150 adapted to be rotatable in the supporting bearing housing 14 and to carry a sleeve bearing insert 151 at one end and the rolling bearing 52 at the other end. Like bearing system 13, the bearing system 130 locates the sleeve bearing insert 151 adjacent the hot end of the turbocharger, and locates the rolling bearing 52 adjacent the compressor end. Except for the differences that permit the outer race 150 to carry sleeve bearing insert 151, the outer race 150 of FIG. 3 and the manner in which outer race 150 is carried by, and coacts with, the supporting bearing housing 14 and rolling bearing 52 are substantially the same as described above for the outer race 50 of FIG. 1.

The entire bearing system 130 is free to rotate in the stationary housing 14. As shown in FIG. 3, lubricating fluid (such as oil) is introduced into passageways 55, 56 and 57 in the stationary housing 14. Such lubricating fluid flows through the passageways 56 and 57 to the interface between the housing 14 and the outer race 150 of the bearing system.

As shown in FIG. 3, however, the outer race 150 includes a passageway 150a to provide a flow of lubrication for the sleeve bearing insert 151. The sleeve bearing insert includes a passageway 151a to provide a flow of lubrication between the inner bearing surface of the sleeve bearing insert 151 and the rotating shaft 15.

Like the bearing system of FIG. 1, bearing system 130 may be inserted into the motor-assisted turbocharger 10 with compressor end parts 19, 16, 17, 14a, 58 and 59 removed. The insertion of the bearing system 130 into the machine 10 is accomplished by merely sliding the outer race 15 with the anti-friction bearing 52 and sleeve bearing insert 151 over the compressor end of shaft 15 sleeve bearing end first. With the same clearances as the bearing system 13 of FIG. 1, the bearing system 130 may be placed in position between the rotating shaft 15 and the stationary machine element 14 with relative ease. The inner race 53 of rolling bearing 52 is clamped after such installation by the machine spacer element 59 as the compressor wheel 16 is clamped to rotate with shaft 15, and the inner race 53 will thus rotate with shaft 15. It is possible to extend inner race 53 and to omit spacer element 59 in many systems.

As set forth above, in the motor-assisted turbocharger 100, the rotating shaft 15 becomes heated and, thus, must expand axially in response to thermal expansion of the material from which it is made. In bearing system 130, thrust-bearing surfaces are provided adjacent the rolling bearing 52 at the cooler end of the machine and the sleeve bearing insert 151 is located at the hotter end of the machine; and the shaft 15 is free to expand through the sleeve bearing insert 151 in response to the heat to which it is exposed.

The bearing system 130 of FIG. 3 provides the same thrust bearing interaction with the housing 14 as the bearing system 13 of FIG. 1 and provides and permits lubrication of the bearing surfaces in substantially the same manner as described above for the bearing system of FIG. 1. The primary difference between bearing system 13 of FIG. 1 and bearing system 130 of FIG. 3 is that the sleeve bearing insert 151 is carried by the outer race 150 and rotates at the same speed as the outer race 150. The bearing system 130, however, enjoys the advantages described above for the bearing system 13 of FIG. 1 in its speeds of rotation, stability and response to unbalanced conditions.

Bearing systems 13 and 130 provide a stable bearing system. Such bearing systems are free to move radially in response to imbalance in the rotating mass. In addition, such bearing systems reduce the relative speeds of rotation between the shaft and the bearing system and between the bearing system and the stationary machine element, thereby eliminating the problems of oil whirl and improving the running life of the bearing system. Thrust loads may be taken at the cooler end of the machine while the shaft is free to expand in response to its exposure to heat through the sleeve bearing at the hot end of the machine. In the bearing system, the oil films cushion the rotating shaft against shock and vibration, provide adequate lubrication, carry away friction-generated heat from the bearing surfaces, and also tend to carry away heat carried down the shaft from the hot end of the machine. The bearing systems 13 and 130 and their improved efficiency and lubrication reduce the heat reaching the magnets and other parts of the assisting electric motor 11.

The bearing systems 13 and 130 may be easily manufactured at low cost and provide a total bearing system that may be inserted easily into the motor-assisted turbocharger, thus providing inexpensive manufacture, repair, and maintenance of the machine. The outer races of the bearing systems may be manufactured from steel and adapted to rotate within housing parts either cast aluminum or cast iron.

While we have shown a preferred embodiment, other embodiments may be devised incorporating the invention described above without departing from the spirit and scope of the following claims.

We claim:

1. A motor-assisted turbocharger for an internal combustion engine including a charge air compressor adjacent one end and an exhaust gas turbine adjacent the other end comprising:
   a compressor wheel at the compressor end of a rotatable shaft, and a turbine wheel having central core and plurality of outwardly extending blades at the turbine end of the rotatable shaft;
   a bearing system for said rotatable shaft including a first roller bearing, a second sleeve bearing axially spaced from said first roller bearing, and a thrust bearing;
   a housing supporting said bearing system,
   said first roller bearing having an inner race engaging said rotatable shaft, an outer race and a plurality of roller bearings interposed between said inner race and outer race, said outer race extending axially from said inner race and providing, at its distal end, said second sleeve bearing, said outer race having an outer bearing surface and radially extending thrust bearing surfaces adapted to be rotatably carried by, and free to rotate within, said housing;
   an assisting electric motor adjacent said compressor wheel and a compressor casing at the compressor end of shaft turbocharger for receiving compressed air for the compressor wheel; and
   a meridionally divided volute for exhaust gas surrounding the turbine wheel and defining a turbine wheel opening permitting exhaust gas from said volute to act on the outwardly extending blades of the turbine wheel, said meridionally divided volute at its turbine wheel opening including a first side directing exhaust gas into the turbine wheel in a direction generally axially into the turbine wheel and a second side directing exhaust gas generally radially into the turbine wheel.

2. The motor-assisted turbocharger in claim 1, wherein said first side directs exhaust gas into said turbine wheel substantially tangent to the central core of the turbine wheel.

3. The motor-assisted turbocharger in claim 1, wherein said first side directs exhaust gas into said turbine wheel at less than the maximum diameter of the turbine wheel, and said second side directs exhaust gas into said turbine wheel at substantially the maximum diameter of said turbine wheel.

4. The motor-assisted turbocharger of claim 1, wherein said turbine includes an exhaust gas outlet and said meridionally divided volute includes an outwardly extending divider wall with outlet portions canted in a direction away from said exhaust gas outlet, said outwardly extending divider wall having opposed side surfaces, each of which form acute angles with the rotatable shaft.

5. The motor-assisted turbocharger of claim 1, wherein said meridionally divided volute includes a divider wall defining first and second volute passages, and wherein the tips of said outwardly extending blades extend closely adjacent to said divider wall at its innermost end for substantially limiting communication between said first and second volute passages at said turbine wheel opening.

6. The motor-assisted turbocharger of claim 5, wherein the extension of the turbine blade tips to closely adjacent the volute divider wall takes place at substantially the maximum diameter of the turbine wheel.

7. The motor-assisted turbocharger of claim 1, wherein said housing includes a first housing part adjacent the compressor wheel and a second housing part adjacent the turbine wheel, and said second housing part supports said bearing system.

8. The motor-assisted turbocharger of claim 7, wherein said assisting electric motor includes a plurality of magnets carried by said compressor wheel, and said first housing part is seated on said second housing part and carries stator windings for assisting electric motor around the plurality of magnets.

9. The motor-assisted turbocharger of claim 8, wherein said first housing part forms a coolant passageway adjacent said stator windings.

10. The motor-assisted turbocharger of claim 9, wherein said coolant passageway encompasses said stator windings.

11. The motor-assisted turbocharger of claim 1, wherein said second sleeve bearing comprises a separate sleeve bearing element rotating with said outer race and having an inner bearing surface adapted to rotatably carry said rotatable shaft.

12. The motor-assisted tubocharger of claim 11, wherein said outer bearing surface of said outer race forms an elongated, cylindrical bearing surface, and wherein said outer race includes an inner surface which expands in diameter from one end thereof adjacent said sleeve bearing to the opposite end thereof adjacent said roller bearings.

13. The motor-assisted turbocharger of claim 11, wherein the outer bearing surface of the outer race has two radially extending, spaced thrust-bearing surfaces at the end adjacent the inner race, and wherein the housing includes means for providing a flow of lubricant to the outer bearing surface of the outer race which also lubricates one of the thrust-bearing surfaces formed by one radially extending surface, and wherein the housing and the bearing system have means to provide a flow of lubricant first to the inner surface of the sleeve bearing, then to the roller bearings, and then to the other radially extending thrust-bearing surface.

14. A motor-assisted turbocharger for an internal combustion engine including a charge air compressor adjacent one end of a rotatable shaft and an exhaust gas turbine adjacent the other end of the rotatable shaft, comprising:
   a compressor wheel at said one end of a rotatable shaft and a turbine wheel having central core and plurality of outwardly extending blades at said other end of the rotatable shaft;
   a bearing system for carrying said rotatable shaft,
   said bearing system comprising a first bearing providing a bearing support for said rotatable shaft at a first location on said shaft and a second bearing providing a bearing support for said rotatable shaft at a second location on said shaft axially spaced from said first location;

a bearing system support, said first bearing comprising a first anti-friction roller bearing means including an inner race engaging said shaft, an outer race, and a plurality of roller bearings interposed between said inner race and said outer race, said outer race extending axially from said first location to said second location of said rotatable shaft and providing said second bearing, said outer race having an outer bearing surface and radially extending thrust bearing surfaces adapted to be rotatably carried by said bearing system support, said bearing system being free to rotate within the bearing system support;

an assisting electric motor adjacent said compressor wheel and a compressor casing at the compressor end of said turbocharger for receiving compressed air for the compressor wheel; and a meridionally divided volute for exhaust gas surrounding the turbine wheel and defining a turbine wheel opening permitting exhaust gas from said volute to act on the outwardly extending blades of the turbine wheel.

15. The motor-assisted turbocharger of claim 14, wherein said second bearing means comprises a sleeve bearing having an inner bearing surface adapted to rotatably carry said rotating shaft at said second location, said sleeve bearing carried by and rotating with said outer race.

16. The motor-assisted turbocharger of claim 15, wherein said outer bearing surface of said outer race forms an elongated, cylindrical bearing surface, and wherein said outer race includes an inner surface which expands in diameter from one end thereof adjacent said sleeve bearing to the opposite end thereof adjacent said roller bearings.

17. The motor-assisted turbocharger of claim 15, wherein the outer bearing surface of the outer race has two transversely extending, spaced surfaces at the end adjacent the inner race and roller bearings to provide a pair of thrust-bearing surfaces for the bearing system, wherein the machine support includes means for providing a flow of lubricant to the outer bearing surface of the outer race which also lubricates one of the thrust-bearing surfaces formed by one transversely extending surface and wherein the bearing system has means to provide a flow of lubricant first to the inner surface of the sleeve bearing, then to the roller bearings, and then to the other transversely extending thrust-bearing surface.

18. The motor-assisted turbocharger of claim 14, wherein the outer race has a pair of spaced surfaces extending normal to the axis of rotation in parallel planes, the rolling bearings comprise ball bearings, and the outer race and machine element interact to limit the speed of rotation of the outer race to less than about one-third the speed of the rotating shaft.

19. The motor-assisted turbocharger of claim 14, wherein a meridionally divided volute at its turbine wheel opening includes a first side directing exhaust gas into the turbine wheel in a direction generally axially into the turbine wheel and a second side directing exhaust gas generally radially into the turbine wheel.

20. The motor-assisted turbocharger of claim 19, wherein said first side directs exhaust gas from the meridionally divided volute into said turbine wheel substantially tangent to the central core of the turbine wheel.

21. The motor-assisted turbocharger of claim 19, wherein said first side directs exhaust gas from the meridionally divided volute into said turbine wheel at less than the maximum diameter of the turbine wheel, and from said second side of the meridionally divided volute into said turbine wheel at substantially the maximum diameter of said turbine wheel.

22. The motor-assisted turbocharger of claim 19, wherein said turbine includes an exhaust gas outlet and said meridionally divided volute includes an outwardly extending divider wall with an outlet portion canted in a direction away from said exhaust gas outlet, said outwardly extending divider wall having opposed side surfaces each of which form an acute angle with said rotatable shaft.

23. The motor-assisted turbocharger of claim 19, wherein said meridionally divided volute includes a divider wall defining first and second volute passages, and wherein the tips of said outwardly extending blades extend closely adjacent to said divider wall at its innermost end for substantially limiting communication between said first and second volute passages at said turbine wheel opening.

24. The motor-assisted turbocharger of claim 23, wherein the extension of the turbine blade tips to closely adjacent the volute divider wall takes place at substantially the maximum diameter of the turbine wheel.

25. The motor-assisted turbocharger of claim 14, wherein the compressor wheel and assisting electric motor are located outboard of said bearing system adjacent said first location.

26. The motor-assisted turbocharger of claim 25, wherein the assisting electric motor comprises a plurality of permanent magnets carried by the compressor wheel.

27. The motor-assisted turbocharger of claim 26, wherein the assisting electric motor comprises stator windings carried within the turbocharger adjacent the plurality of permanent magnets, and the turbocharger includes a housing portion forming a passageway for coolant adjacent the stator windings.

28. A motor-assisted turbocharger for an internal combustion engine including a charge air compressor adjacent one end and an exhaust gas turbine adjacent the other end, comprising:

a compressor wheel at a compressor end of a rotatable shaft, and a turbine wheel having central core and plurality of outwardly extending blades at a turbine end of the rotatable shaft;

a bearing system for said rotating shaft, including:

an independent outer race adapted to be rotatable in a support and carried on a film of lubricant and to provide a thrust bearing and a rolling bearing at the compressor end of the outer race and a sleeve bearing at the turbine end of the outer race, said independent outer race having an elongated cylindrical bearing surface and radially extending thrust bearing surfaces, and a housing rotatably supporting said independent outer race;

an assisting electric motor adjacent said compressor wheel and a compressor casing at the compressor end of said turbocharger for receiving compressed air for the compressor wheel; and a meridionally divided volute for exhaust gas surrounding the turbine wheel and defining a turbine wheel opening permitting exhaust gas from said volute to act on the outwardly extending blades of the turbine wheel.

29. The motor-assisted turbocharger of claim 28, wherein said bearing system is adapted to support the rotatable shaft extending within the motor-assisted turbocharger from the turbine end exposed to hot gas to a cooler compressor end, and wherein the sleeve bearing is an insert carried by the independent outer sleeve.

30. The motor-assisted turbocharger of claim 28, wherein the outer race includes outwardly projecting surfaces and forms a thrust bearing at its end adjacent the compressor end of the turbocharger.

31. The motor-assisted turbocharger of claim 29, wherein the sleeve bearing insert is pressed into the outer race, and the outer race is adapted to cooperate wit its support to permit radial movement in response to imbalance and to permit axial expansion of the rotatable shaft in the sleeve bearing and to provide axial bearing support.

32. The motor-assisted turbocharger of claim 28, wherein the rolling bearing is a conventional ball bearing carried by the outer race.

33. The motor-assisted turbocharger of claim 28, wherein the outer sleeve has a pair of outwardly projecting thrust-bearing surfaces at its end adjacent the rolling bearing, and wherein the elongated cylindrical outer bearing surface and its support are adapted to provide a lubricating film having an average thickness of from about 0.0051 cm. to about 0.0192 cm., and the outer sleeve rotates at about one-tenth the speed of rotation of the rotatable shaft.

34. The motor-assisted turbocharger of claim 28, wherein the compressor wheel and assisting electric motor are outboard of the bearing system.

35. The motor-assisted turbocharger of claim 34, wherein the assisting electric motor comprises a plurality of permanent magnets carried by the compressor wheel.

36. The motor-assisted turbocharger of claim 34, wherein the assisting electric motor comprises stator windings adjacent a rotating surface of the compressor wheel and a coolant passage is provided within the motor-assisted turbocharger adjacent the stator windings.

* * * * *

UNITED STATES PATENT AND TRADEMARK OFFICE
CERTIFICATE OF CORRECTION

PATENT NO.     : 6,032,466
DATED          : March 7, 2000
INVENTOR(S)    : William E. Woollenweber and Edward M. Halimi It is certified that error appears in the above-identified patent and that said Letters Patent is hereby corrected as shown below:

<u>Column 13,</u>
Line 29, after "bearing" and before "carried" please insert -- being --.

<u>Column 15,</u>
Line 9, please delete "wit" and insert -- with --.

<u>Column 16,</u>
Line 4, please delete "0.0192" and insert -- 0.0102 --.

Signed and Sealed this

Thirteenth Day of May, 2003

JAMES E. ROGAN
*Director of the United States Patent and Trademark Office*